US011611255B2

United States Patent
Patel et al.

(10) Patent No.: US 11,611,255 B2
(45) Date of Patent: Mar. 21, 2023

(54) HIGH-SPEED EDGE-WOUND ROTOR

(71) Applicant: Hamilton Sundstrand Corporation, Charlotte, NC (US)

(72) Inventors: Dhaval Patel, Schaumburg, IL (US); Andrew R. Wilkinson, Cherry Valley, IL (US); Eric A. Brust, Rockton, IL (US); Edward C. Allen, Davis, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 241 days.

(21) Appl. No.: 17/159,862

(22) Filed: Jan. 27, 2021

(65) Prior Publication Data

US 2022/0239175 A1 Jul. 28, 2022

(51) Int. Cl.
| | |
|---|---|
| *H02K 3/18* | (2006.01) |
| *H02K 3/12* | (2006.01) |
| *H02K 3/28* | (2006.01) |
| *H02K 15/02* | (2006.01) |
| *H02K 15/06* | (2006.01) |

(52) U.S. Cl.
CPC ............ *H02K 3/18* (2013.01); *H02K 3/12* (2013.01); *H02K 3/28* (2013.01); *H02K 15/026* (2013.01); *H02K 15/065* (2013.01)

(58) Field of Classification Search
CPC .. H02K 3/00; H02K 3/04; H02K 3/14; H02K 3/18; H02K 3/28; H02K 3/30; H02K 3/32; H02K 3/34; H02K 3/48; H02K 3/52; H02K 3/527
See application file for complete search history.

(56) References Cited

U.S. PATENT DOCUMENTS

| | | | |
|---|---|---|---|
| 4,131,988 A | 1/1979 | Finegold | |
| 5,298,823 A | 3/1994 | Johnsen | |
| 6,002,320 A | 12/1999 | Uda et al. | |
| 7,646,131 B2 | 1/2010 | Georg et al. | |
| 10,305,355 B2 | 5/2019 | Koga et al. | |
| 10,439,462 B2 | 10/2019 | Hirao | |
| 2010/0176683 A1 | 7/2010 | Waddell et al. | |
| 2010/0194214 A1* | 8/2010 | Takahashi | H02K 9/19 310/43 |
| 2018/0269757 A1 | 9/2018 | Fiederling et al. | |

FOREIGN PATENT DOCUMENTS

| | | | |
|---|---|---|---|
| CN | 203326759 U | 12/2013 | |
| EP | 1724904 A2 | 11/2006 | |
| EP | 3624311 A1 | 3/2020 | |
| JP | 06319130 B2 | 5/2018 | |
| KR | 1417598 B1 | 7/2014 | |
| WO | WO2021131575 * | 7/2021 | ............ H02K 3/04 |

OTHER PUBLICATIONS

Search Report issued in European Patent Application No. 21215272.2; Application Filing Date Dec. 16, 2021 dated Jun. 7, 2022 (4 pages).

\* cited by examiner

*Primary Examiner* — Tran N Nguyen
(74) *Attorney, Agent, or Firm* — Cantor Colburn LLP

(57) ABSTRACT

A rotor having multiple poles is provided and includes at each pole an end winding support forming a channel, a bus bar disposed in the channel and edge-wound coils disposed to extend around the end-winding support and the bus bar. The edge-wound coils are stacked radially and include an inner diameter coil routed to an adjacent pole and brazed to an inner diameter coil of the adjacent pole and an outer diameter coil brazed to the bus bar.

20 Claims, 3 Drawing Sheets

HIGH-SPEED EDGE-WOUND ROTOR

BACKGROUND

The present disclosure relates to rotors and, in particular, a high-speed edge-wound rotor.

A rotor is a moving component of an electromagnetic system and can be provided in an electric motor, an electric generator or alternator. Rotation of the rotor is due to interactions between windings and magnetic fields which produce a torque around an axis of the rotor. A wound rotor typically includes a cylindrical core with slots to hold wiring for 3-phase windings.

BRIEF DESCRIPTION

According to an aspect of the disclosure, a rotor having multiple poles is provided and includes at each pole an end winding support forming a channel, a bus bar disposed in the channel and edge-wound coils disposed to extend around the end-winding support and the bus bar. The edge-wound coils are stacked radially and include an inner diameter coil routed to an adjacent pole and brazed to an inner diameter coil of the adjacent pole and an outer diameter coil brazed to the bus bar.

In accordance with additional or alternative embodiments, the rotor is a high-speed edge-wound rotor with eight or more poles which is rotatable at about ~12 kRPM or more.

In accordance with additional or alternative embodiments, each end winding support includes dielectric material.

In accordance with additional or alternative embodiments, direct current (DC) connections extend radially inwardly from two of the multiple poles, pole bus bars extend between adjacent pairs of the multiple poles besides the two of the multiple poles and bolted connections connect the DC connections and the pole bus bars to the corresponding bus bar.

In accordance with additional or alternative embodiments, the rotor includes a shaft into which the DC connections extend.

In accordance with additional or alternative embodiments, each of the pole bus bars is flexible.

In accordance with additional or alternative embodiments, the edge-wound coils are flat, ribbon-shaped coils.

In accordance with additional or alternative embodiments, coil supporters are disposed between adjacent poles and each coil supporter forms a slot through which a corresponding inner diameter coil is routable.

In accordance with additional or alternative embodiments, the inner diameter coil is brazed to the inner diameter coil of the adjacent pole at a first braze joint, the outer diameter coil is brazed to the corresponding bus bar at a second braze joint, the first braze joint is supported by the corresponding end winding support and the first and second braze joints are movable relative to the corresponding edge-wound coils.

According to an aspect of the disclosure, a rotor having multiple poles is provided and incudes at each pole an end winding support including a radial section forming a radial channel and an axial section extending from the radial section and forming an axial channel, a bus bar including radial and axial portions disposed in the radial and axial channels, respectively, and edge-wound coils disposed to extend around the radial section of the end-winding support and the radial portion of the bus bar. The edge-wound coils are stacked radially and include an inner diameter coil routed to an adjacent pole and brazed to an inner diameter coil of the adjacent pole and an outer diameter coil brazed to the axial portion of the bus bar.

In accordance with additional or alternative embodiments, the rotor is a high-speed edge-wound rotor with eight or more poles which is rotatable at about ~12 kRPM or more.

In accordance with additional or alternative embodiments, each end winding support includes dielectric material.

In accordance with additional or alternative embodiments, direct current (DC) connections extend radially inwardly from two of the multiple poles, pole bus bars extend between adjacent pairs of the multiple poles besides the two of the multiple poles and bolted connections connect the DC connections and the pole bus bars to an inner diameter of the radial portion of the corresponding bus bar.

In accordance with additional or alternative embodiments, the rotor includes a shaft into which the DC connections extend.

In accordance with additional or alternative embodiments, each of the pole bus bars is flexible.

In accordance with additional or alternative embodiments, the edge-wound coils are flat, ribbon-shaped coils.

In accordance with additional or alternative embodiments, coil supporters are disposed between adjacent poles and each coil supporter forms a slot through which a corresponding inner diameter coil is routable.

In accordance with additional or alternative embodiments, the inner diameter coil is brazed to the inner diameter coil of the adjacent pole at a first braze joint, the outer diameter coil is brazed to the axial portion of the corresponding bus bar at a second braze joint, the first braze joint is supported by the corresponding end winding support and the first and second braze joints are movable relative to the corresponding edge-wound coils.

According to an aspect of the disclosure, a method of assembling each pole of a rotor having multiple poles is provided and includes forming an end winding support to include a radial section forming a radial channel and an axial section extending from the radial section and forming an axial channel, placing the end winding support at an end of the rotor, disposing radial and axial portions of a bus bar in the radial and axial channels, respectively, extending edge-wound coils around the radial section of the end-winding support and the radial portion of the bus bar such that the edge-wound coils are stacked radially and include inner and outer diameter coils, routing the inner diameter coil to an adjacent pole and brazing the inner and outer diameter coils to an inner diameter coil of the adjacent pole and to the axial portion of the bus bar, respectively.

In accordance with additional or alternative embodiments, the rotor is a high-speed edge-wound rotor with eight or more poles which is rotatable at about ~12 kRPM or more.

Additional features and advantages are realized through the techniques of the present disclosure. Other embodiments and aspects of the disclosure are described in detail herein and are considered a part of the claimed technical concept. For a better understanding of the disclosure with the advantages and the features, refer to the description and to the drawings.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
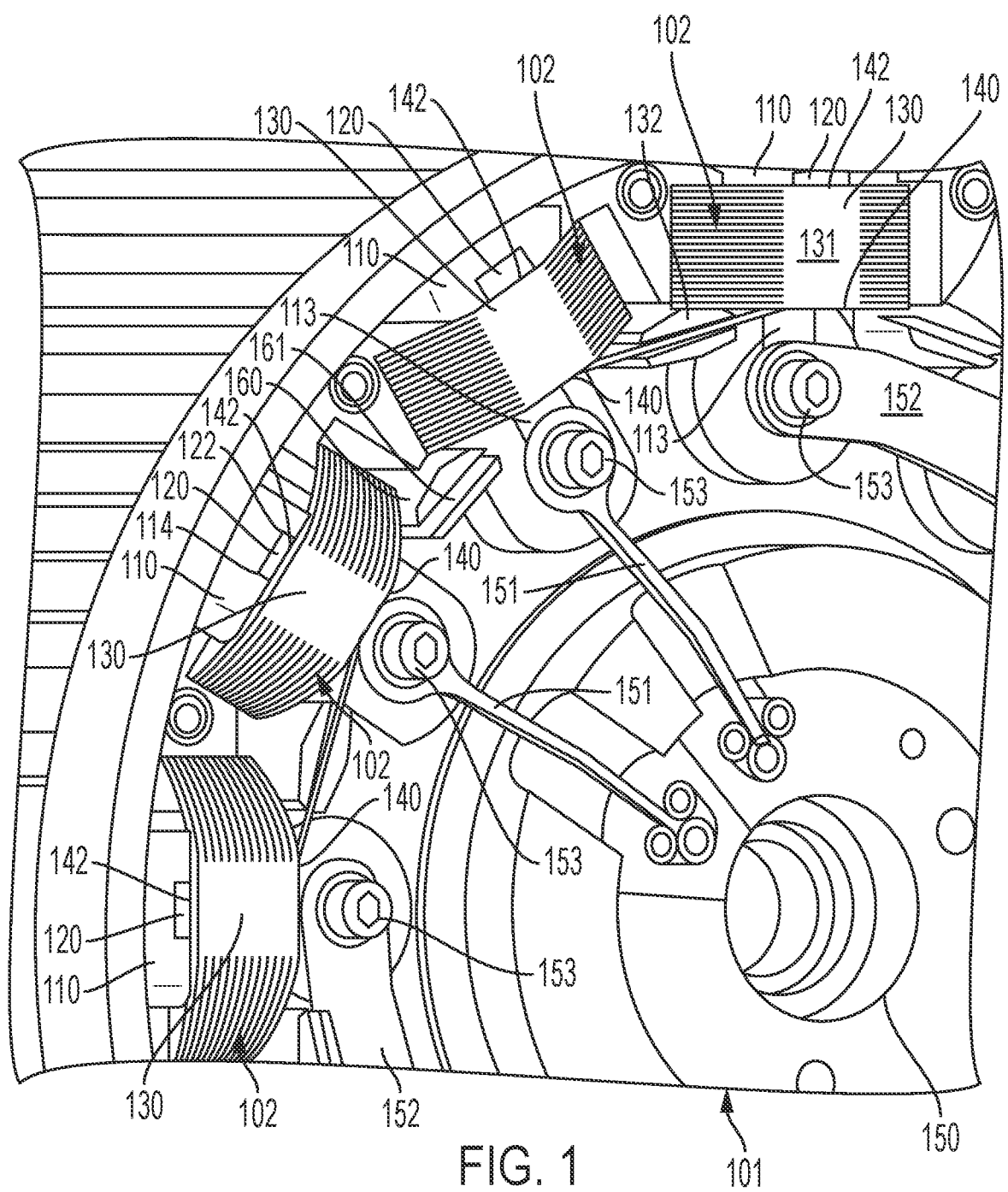
FIG. 1 is a perspective view of a high-speed edge-wound rotor having multiple poles in accordance with embodiments.

Aerospace generators and motors often utilize wound rotors that have one of two types of windings: round wire windings and edge-wound coil windings.

A round wire rotor is typically utilized in aerospace generators because it allows for a single conductor to be wound around multiple poles. A benefit to this is that the winding does not require connections between poles, which reduces size and increases reliability. Problems with round wire designs is that for higher speed applications (15 kRPM or greater), the windings will tend to move. In addition, these types of rotor can exhibit self-induced vibration issues due to variations that can occur during the winding process in which the wire is typically wound into the rotor with some amount of tension to keep the winding in place. This tension can vary from winder to winder and, as a result, the slot fill can vary from unit to unit. Another disadvantage to utilizing round wire is that if the winding is not impregnated, the wires can move during operation and abroad and wear out the insulation system.

Flat wire or edge-wound coil winding systems can be more stable from a dynamic perspective than round wire designs because the flat wires are more discrete and can be stacked and supported easier. An issue with the flat wire systems is that they can be very difficult to manufacture with a pole count greater than eight poles for the diameters utilized on aircraft generators.

Aircraft generators with pole counts of eight poles or less have double-layered windings. The first layer or inner layer is wound from an inner diameter to an outer diameter. The second layer or outer layer is wound from an outer diameter to an inner diameter. The two coils are connected at the outer diameter or the coil is wound as a single coil. All the pole-to-pole connections are completed on the inner diameter and tied to the coils to provide strain relief.

For pole counts of ten or higher, the windings can only accommodate a single layer of winding. As a result, the start of the winding is on the inner diameter and the finish is at the outer diameter. This requires a pole-to-pole connection to be made on the outer diameter. Because of the smaller pole area, there is often insufficient spacing to complete a braze joint without causing damage to surrounding components from the brazing operation. Additionally, the smaller area does not allow for structural considerations to be added for proper mechanical support of the jumper wire. These issues are magnified as rotational speeds exceed about 12 kRPM or more.

As will be described below, a high-speed edge-wound rotor with eight or more poles is provided with edge-wound coils, a novel outer diameter connection and an inner diameter pole-to-pole connection. In order to make the inner diameter pole-to-pole connection, a wire from one coil is routed to an adjacent coil and brazed to the adjacent coil. The braze joint is then supported by a wire stack by being laced to the stack. A lead wire is routed through a coil supporter which moves with the coils so the lead wire moves relatively with the coils and reduces stress on the lead wire. The outer diameter connection is made by brazing the coil to a coil bus bar which is routed under the coil in a channel in a plastic end winding support and connected to the adjacent pole via a pole bus bar. The braze joint between the coil bus bar and the coil is fully supported by the end winding support. As the high-speed edge-wound rotor starts and stops rotating, the braze joints will be fully supported and will move relative to the coils. The pole bus bar is designed to flex and withstand the start/stop cycles.

Figure 2:
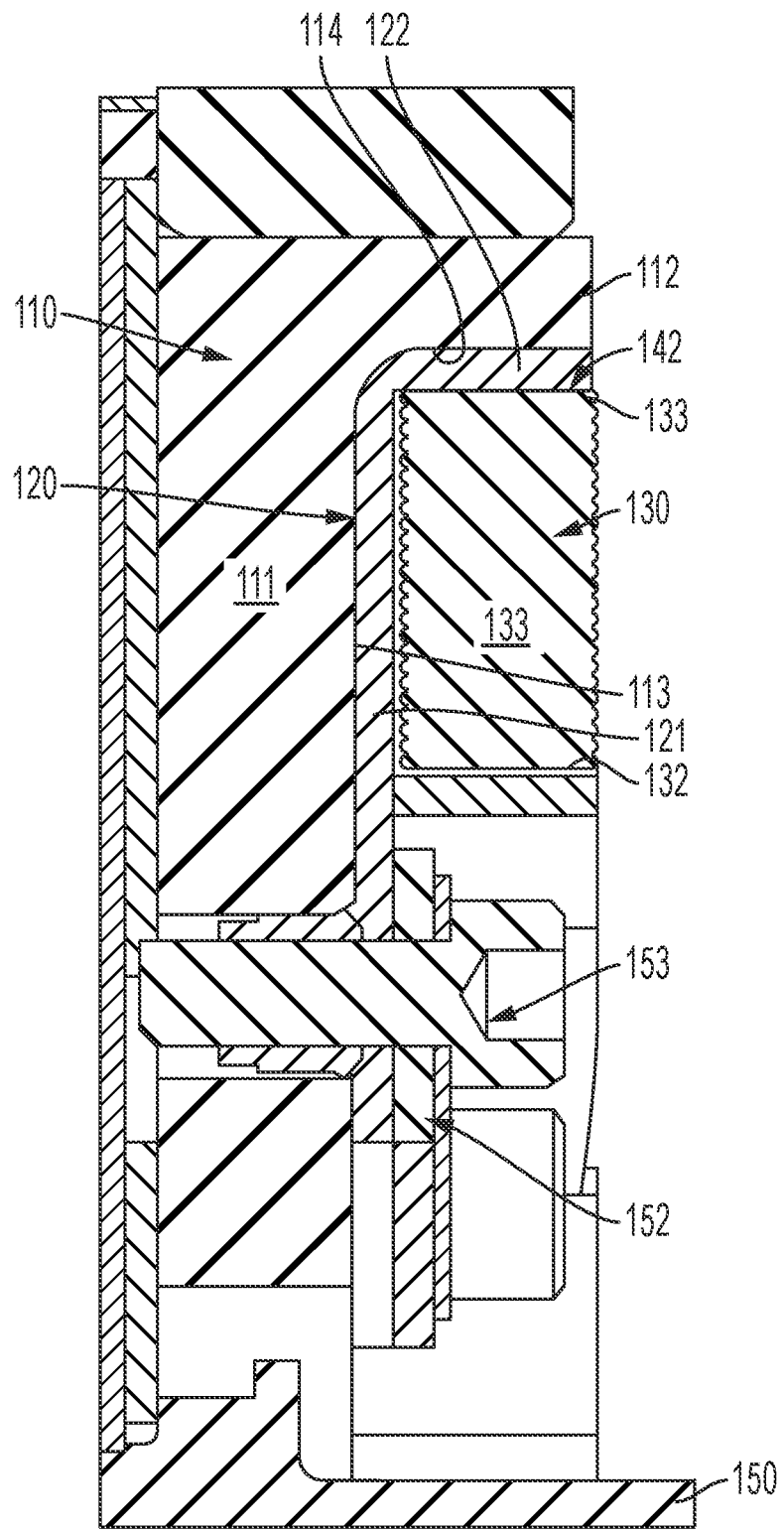
FIG. 2 is a side view of components of the high-speed edge-wound rotor having multiple poles of FIG. 1 in accordance with embodiments.
Figure 3:
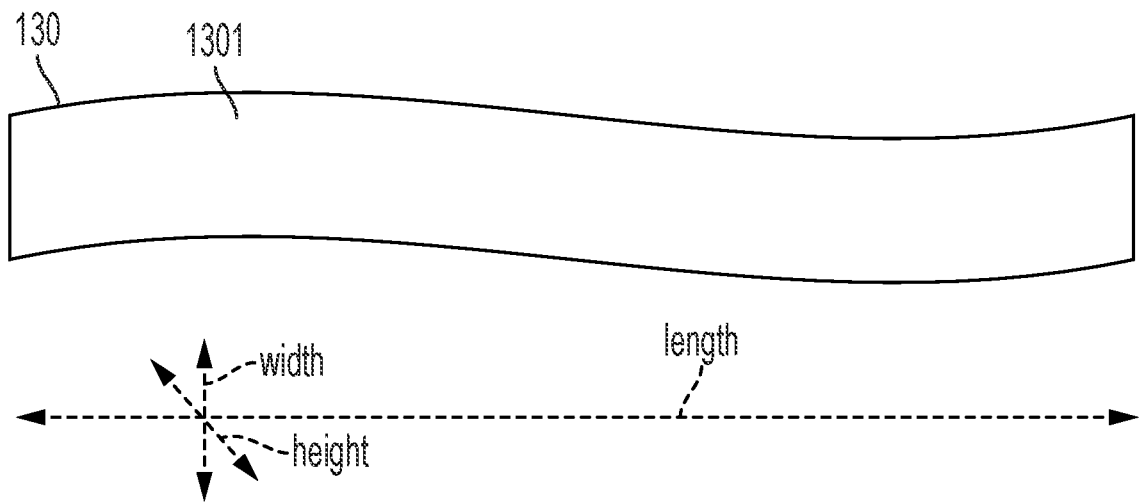
FIG. 3 is a perspective view of an edge-wound coil for use in the high-speed edge-wound rotor of FIGS. 1 and 2 in accordance with embodiments.

With reference to FIGS. 1-3, a rotor 101 is provided and has multiple poles 102. The rotor 101 can be configured, for example, as a high-speed edge-wound rotor that has eight or more poles and is rotatable at about ~12 kRPM or more. The following description will relate to this configuration although it is to be understood that this is done for clarity and brevity and is not intended to otherwise limit the scope of the description.

The rotor 101 includes, at each of the multiple poles 102, an end winding support 110, a bus bar 120 and edge-wound coils 130. The end winding support 110 includes a dielectric material, such as plastic. The end winding support 110 is placed at an axial or longitudinal end of the rotor 101 and includes a radial section 111 and an axial section 112. The radial section 111 extends radially along the axial or longitudinal end of the rotor 101 and is formed to define a radial channel 113. The axial section 112 extends from an outboard end of the radial section 111 in an axial direction defined away from the axial or longitudinal end of the rotor 101. The axial section 112 is formed to define an axial channel 114. The bus bar 120 includes a radial portion 121 that is disposed in the radial channel 113 and an axial portion 122 that extends in an axial direction from an outboard end of the radial portion 121 and is disposed in the axial channel 114. The edge-wound coils 130 are disposed to extend around the radial section 111 of the end-winding support 110 and the radial portion 121 of the bus bar 120. The edge-wound coils 130 are each flat and ribbon-shaped coils 1301 (see FIG. 3) which are elongate in a length-wise dimension, relatively wide in a width-wise dimension and relatively short in a height-wise dimension. The edge-wound coils 130 are stacked in a radial direction to form a stack 131 that includes an inner diameter coil 132 and an outer diameter coil 133. The inner diameter coil 132 is routed to a stack 131 of an adjacent pole 102 and brazed at a first braze joint 140 to an inner diameter coil 132 of the stack 131 of the adjacent pole 102. The outer diameter coil 133 is brazed at a second braze joint 142 to the axial portion 122 of the bus bar 120.

The first braze joint 140 is thus supported by the corresponding end winding support 110 and the first and second braze joints 140 and 142 are thus movable relative to the corresponding edge-wound coils 130. As such, as the rotor 101 starts and stops over many start/stop cycles, the first and second braze joints 140 and 142 will be fully supported and movable relative to the edge-wound coils 130.

In accordance with embodiments, the rotor 101 can further include a shaft 150, direct current (DC) connections 151 that extend radially inwardly into the shaft 150 from two of the multiple poles 102, pole bus bars 152 and bolted connections 153. The pole bus bars 152 extend between adjacent pairs of the multiple poles 102 besides the two of the multiple poles 102 where the DC connections 151 are provided. The bolted connections 153 respectively connect the DC connections 151 and the pole bus bars 152 to an inner diameter of the radial portion 121 of the corresponding bus bar 120. At least the pole bus bars 152 can include flexible material that allows the pole bus bars 152 to be flexible and to withstand repeated start/stop cycles of the rotor 101.

In accordance with embodiments, the rotor 101 can also include coil supporters 160. The coil supporters 160 are each disposed between a pair of adjacent poles 102. Each coil supporter 160 is formed to define a slot 161 through which a corresponding inner diameter coil 132 is routable (not all of the coil supporters 160 will have a slot 161 through which a coil is routed).

Figure 4:
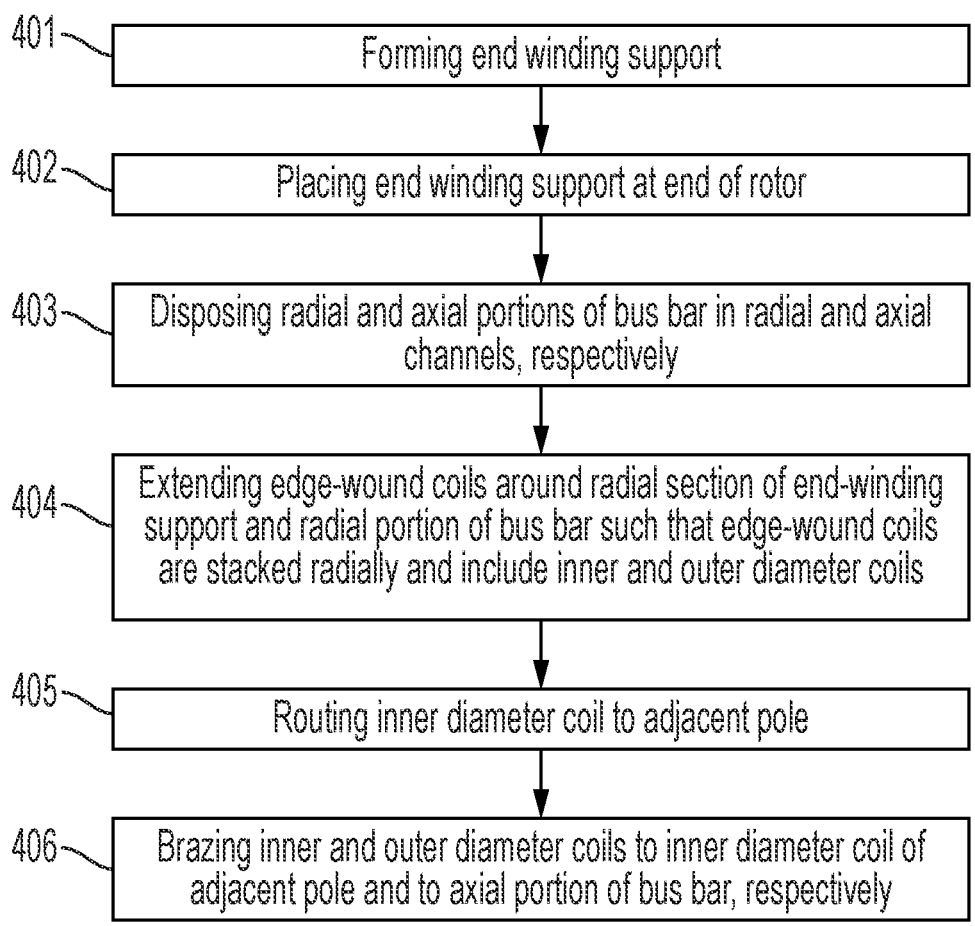
FIG. 4 is a flow diagram illustrating a method of assembling each pole of a rotor having multiple poles in accordance with embodiments.

With continued reference to FIGS. 1-3 and with additional reference to FIG. 4, a method of assembling each pole 102 of rotor 101 having multiple poles 102 as described above is provided. The method includes forming the end winding support 110 to include radial section 111 forming the radial channel 113 and the axial section 112 extending from the radial section 111 and forming the axial channel 114 (401). The method further includes placing the end winding support 110 at an end of the rotor 101 (402) and disposing the radial and axial portions 121 and 122 of the bus bar 120 in the radial and axial channels 113 and 114, respectively (403). The method also includes extending the edge-wound coils 130 around the radial section 111 of the end-winding support 110 and the radial portion 121 of the bus bar 120 such that the edge-wound coils 130 are stacked radially and include the inner and outer diameter coils 132 and 133 (404), routing the inner diameter coil 132 to an adjacent pole 102 (405) and brazing the inner and outer diameter coils 132 and 133 to an inner diameter coil 132 of the adjacent pole 102 and to the axial portion 122 of the bus bar 120, respectively (406).

Technical effects and benefits of the present disclosure are the provision of a high-speed edge-wound rotor in which all pole-to-pole connections are moved to an inner diameter with all the braze joints being fully supported to allow for high-speed operation which minimizing a package size. The brazing can be done with the coils being loose or with the coils having already been installed on the rotor. In addition, the high-speed edge-wound rotor allows for flexibility with regards to the DC connections because the DC connections are provided as bolted connections (i.e., the DC connections can be provided as a bus bar, a lead wire with a ring tongue, etc.). The high-speed edge-wound rotor is modular and can be applied to a rotor with four poles or greater.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the technical concepts in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

While the preferred embodiments to the disclosure have been described, it will be understood that those skilled in the art, both now and in the future, may make various improvements and enhancements which fall within the scope of the claims which follow. These claims should be construed to maintain the proper protection for the disclosure first described.

What is claimed is:

1. A rotor having multiple poles and comprising at each pole:
    an end winding support forming a channel;
    a bus bar disposed in the channel; and
    edge-wound coils disposed to extend around the end-winding support and the bus bar,
    the edge-wound coils being stacked radially and comprising an inner diameter coil routed to an adjacent pole and brazed to an inner diameter coil of the adjacent pole and an outer diameter coil brazed to the bus bar.

2. The rotor according to claim 1, wherein the rotor is a high-speed edge-wound rotor with eight or more poles which is rotatable at about ~12 kRPM or more.

3. The rotor according to claim 1, wherein each end winding support comprises dielectric material.

4. The rotor according to claim 1, further comprising:
    direct current (DC) connections extending radially inwardly from two of the multiple poles;
    pole bus bars extending between adjacent pairs of the multiple poles besides the two of the multiple poles; and
    bolted connections which connect the DC connections and the pole bus bars to the corresponding bus bar.

5. The rotor according to claim 4, further comprising a shaft into which the DC connections extend.

6. The rotor according to claim 4, wherein each of the pole bus bars is flexible.

7. The rotor according to claim 1, wherein the edge-wound coils are flat, ribbon-shaped coils.

8. The rotor according to claim 1, further comprising coil supporters disposed between adjacent poles, each coil supporter forming a slot through which a corresponding inner diameter coil is routable.

9. The rotor according to claim 1, wherein the inner diameter coil is brazed to the inner diameter coil of the adjacent pole at a first braze joint, the outer diameter coil is brazed to the corresponding bus bar at a second braze joint, the first braze joint is supported by the corresponding end winding support and the first and second braze joints are movable relative to the corresponding edge-wound coils.

10. A rotor having multiple poles and comprising at each pole:
    an end winding support comprising a radial section forming a radial channel and an axial section extending from the radial section and forming an axial channel;
    a bus bar comprising radial and axial portions disposed in the radial and axial channels, respectively; and
    edge-wound coils disposed to extend around the radial section of the end-winding support and the radial portion of the bus bar,
    the edge-wound coils being stacked radially and comprising an inner diameter coil routed to an adjacent pole and brazed to an inner diameter coil of the adjacent pole and an outer diameter coil brazed to the axial portion of the bus bar.

11. The rotor according to claim 10, wherein the rotor is a high-speed edge-wound rotor with eight or more poles which is rotatable at about ~12 kRPM or more.

12. The rotor according to claim 10, wherein each end winding support comprises dielectric material.

13. The rotor according to claim 10, further comprising:
    direct current (DC) connections extending radially inwardly from two of the multiple poles;

pole bus bars extending between adjacent pairs of the multiple poles besides the two of the multiple poles; and bolted connections which connect the DC connections and the pole bus bars to an inner diameter of the radial portion of the corresponding bus bar.

14. The rotor according to claim 13, further comprising a shaft into which the DC connections extend.

15. The rotor according to claim 13, wherein each of the pole bus bars is flexible.

16. The rotor according to claim 10, wherein the edge-wound coils are flat, ribbon-shaped coils.

17. The rotor according to claim 10, further comprising coil supporters disposed between adjacent poles, each coil supporter forming a slot through which a corresponding inner diameter coil is routable.

18. The rotor according to claim 10, wherein the inner diameter coil is brazed to the inner diameter coil of the adjacent pole at a first braze joint, the outer diameter coil is brazed to the axial portion of the corresponding bus bar at a second braze joint, the first braze joint is supported by the corresponding end winding support and the first and second braze joints are movable relative to the corresponding edge-wound coils.

19. A method of assembling each pole of a rotor having multiple poles, the method comprising:

forming an end winding support to comprise a radial section forming a radial channel and an axial section extending from the radial section and forming an axial channel;

placing the end winding support at an end of the rotor;

disposing radial and axial portions of a bus bar in the radial and axial channels, respectively;

extending edge-wound coils around the radial section of the end-winding support and the radial portion of the bus bar such that the edge-wound coils are stacked radially and comprise inner and outer diameter coils;

routing the inner diameter coil to an adjacent pole; and brazing the inner and outer diameter coils to an inner diameter coil of the adjacent pole and to the axial portion of the bus bar, respectively.

20. The method according to claim 19, wherein the rotor is a high-speed edge-wound rotor with eight or more poles which is rotatable at about ~12 kRPM or more.

* * * * *